(No Model.)

A. H. PINE & S. A. NORTON.
CRACKER BOX COVER.

No. 392,459. Patented Nov. 6, 1888.

WITNESSES:
Fred G. Dieterich
Edw. W. Byrn.

INVENTORS,
A. H. Pine &
S. A. Norton.
BY Munn & Co.
ATTORNEYS.

UNITED STATES PATENT OFFICE.

ALBERT H. PINE AND STEPHEN A. NORTON, OF PINE BLUFF, ARKANSAS.

CRACKER-BOX COVER.

SPECIFICATION forming part of Letters Patent No. 392,459, dated November 6, 1888.

Application filed July 23, 1888. Serial No. 280,852. (No model.)

*To all whom it may concern:*

Be it known that we, ALBERT H. PINE and STEPHEN A. NORTON, of Pine Bluff, in the county of Jefferson and State of Arkansas, have invented a new and useful Improvement in Cracker-Box Covers, of which the following is a specification.

Our invention is in the nature of an improved cover for cracker and cake boxes, which, while excluding flies and preventing the drying out of the contents, will still permit the crackers to be visible from the outside and permit the contents to be conveniently removed as they are sold.

It consists in the peculiar construction and arrangement of parts, which we will now proceed to fully describe with reference to the drawings, in which—

Figure 1:
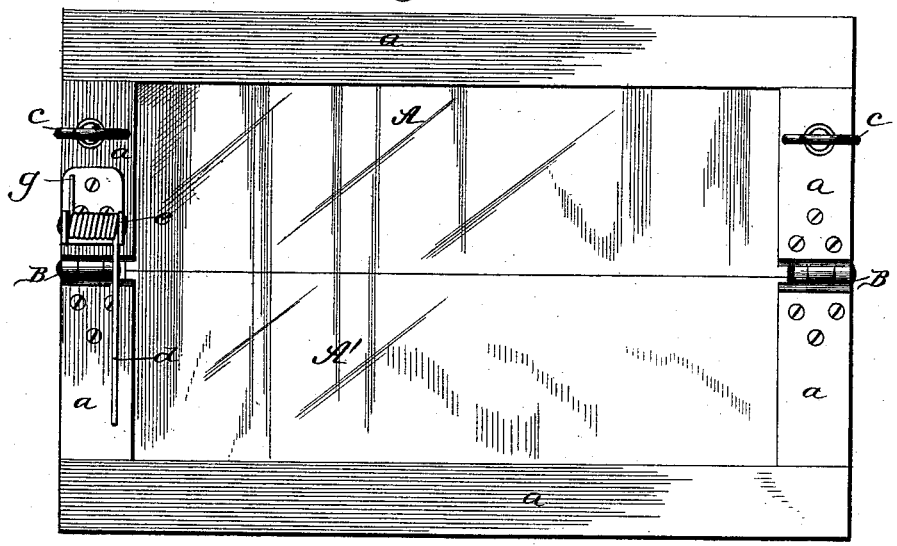
Figure 2:
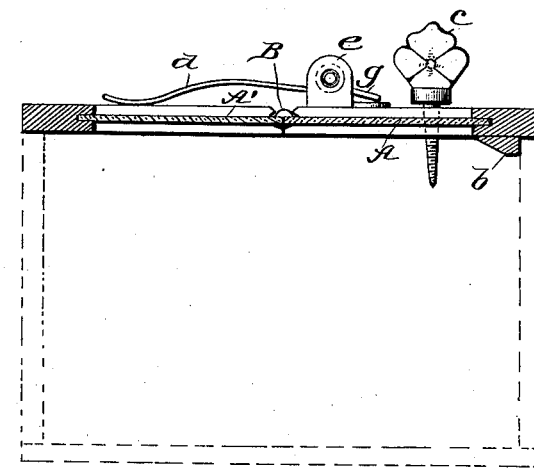

Figure 1 is a plan view of the cover, and Fig. 2 a transverse section thereof showing the box in dotted lines.

A A' represent the cover, which is made in two glass sections hinged about a middle longitudinal line. The two sections of cover have around three of their edges a marginal frame, $a$, but along their fourth edges, which face each other upon the middle longitudinal line, there is no marginal frame; but the glass frames simply approach each other closely, so as to make a close fit. In order to prevent the joint between the two glass edges from opening when one of the sections of the cover is raised, the hinges B B, which connect the two sections, are mortised into the middle line of the marginal frame, so that the axis of the hinge will be in the plane of the glass and coincident with the joint between the glass panes.

One section, A, of the cover is provided on its under side with a rib or flange, $b$, which fits inside the edge of the box, and this section is also held down tightly to the box by two thumb-screws, $c$ $c$, which pass through the end sections of the frame and penetrate the walls of the box. The other section, A', of the cover is the one through which access may be had to the interior of the box, and this section is held down with an elastic pressure by means of a spring-arm, $d$, which bears thereagainst, and is part of a spiral spring, $e$, wound upon a pin or bolt, $f$, held in a metal plate, $g$, screwed to the frame of the other section of the cover.

With the above construction it will be seen that the cover may be conveniently applied to any box of crackers or cakes and the contents kept in full view for inspection.

Having thus described our invention, what we claim as new is—

1. A cover for a cracker or cake box, consisting of two marginal frames with glass panels, the marginal frames extending around the three sides of the sections of the cover with the edges of the glass panels facing each other, and a pair of hinges connecting the two sections and having their axis in the line of the joint between the glass panels, substantially as and for the purpose described.

2. A cover for a cracker-box, consisting of the two hinged glass-panel sections A A', having their glass panels abutting or facing each other without frame-work between them, a pair of hinges having their axes in the line of the joint between the glass panels, a spring for holding one hinged section down, and a set-screw and a rib for attaching the cover to the box, substantially as and for the purpose described.

ALBERT H. PINE.
STEPHEN A. NORTON.

Witnesses to signature of Albert H. Pine:
GEO. W. GORE,
C. H. BRIDGES.

Witnesses to signature of Stephen A. Norton:
W. B. DUKE,
R. H. MCFADDEN.